Oct. 3, 1950 W. J. OSTREICHER ET AL 2,524,712
HORIZONTAL SWEEP CIRCUIT
Filed Jan. 21, 1949

INVENTORS
ROBERT S. MAUTNER AND
WARREN J. OSTREICHER
BY
ATTORNEY

Patented Oct. 3, 1950

2,524,712

UNITED STATES PATENT OFFICE 2,524,712

HORIZONTAL SWEEP CIRCUIT

Warren J. Ostreicher and Robert S. Mautner, New York, N. Y., assignors to Tele-Tone Radio Corporation, a corporation of New York Application January 21, 1949, Serial No. 72,048

20 Claims. (Cl. 315—27)

This invention relates to cathode ray tube circuits and especially to a horizontal sweep circuit such as is used in television receivers or the like image reproducing apparatus.

It is one of the objects of this invention to provide a sweep circuit of very simple construction with a minimum of tubes and as few and as inexpensive circuit elements as possible, yet accurate in operation and easy to adjust if necessary.

It is another object of this invention to obtain without complex arrangements a high peak-to-peak saw tooth voltage from a low voltage source.

It is a further object of this invention to obtain phase inversion without the use of a particular inverter stage or tube.

Still another object of this invention is to provide a simple phase separation circuit and to use oscillations derived from such phase separation circuit to initiate oscillations in a preceding saw tooth generator or amplifier stage.

A more specific object of the invention is a new system for obtaining a high peak-to-peak saw tooth voltage from a low voltage source.

In a specific embodiment of this system, a multivibrator or oscillator of the blocking type or any other source of driving voltage is applied to control a phase inverted or phase inverter amplifier interposed between oscillator and load circuits, wherein the phase inversion is accomplished by coupling the cathodes of two triodes, over a relatively low resistance inductancec to the control electrode of at least one of the triodes.

These and other objects of the invention will be apparent from the accompanying drawings and their descriptions:

Figure 1:
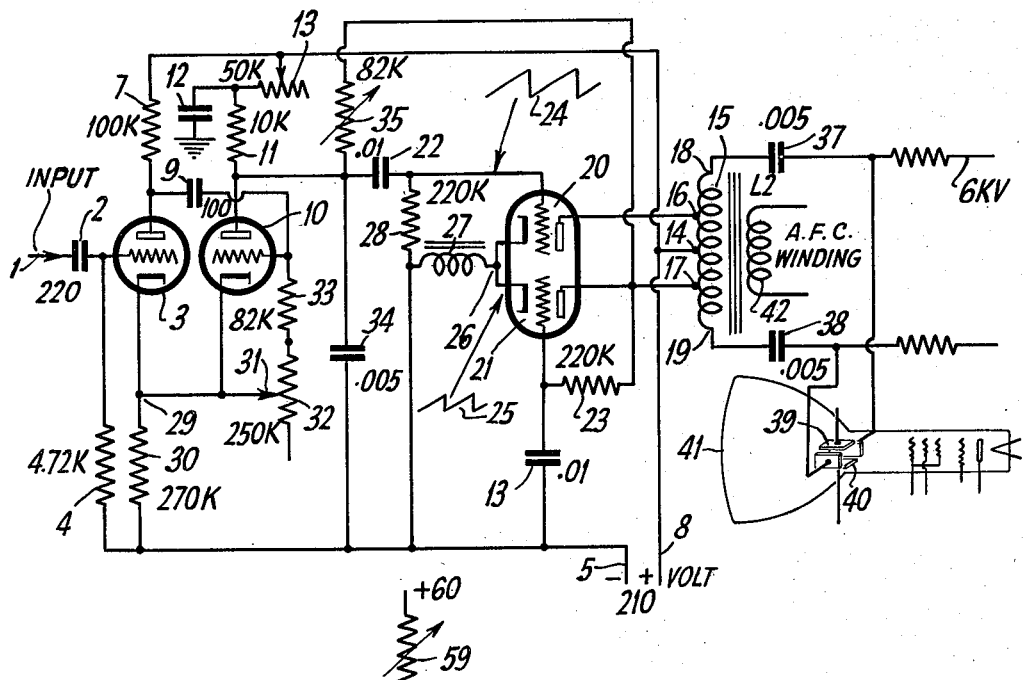
Fig. 1 shows a circuit diagram of a horizontal sweep circuit embodying the principle of the invention.

In Fig. 1, the synchronizing signals are applied at terminal 1 and over condenser 2 of 220 microfarads to the grid of a saw tooth oscillator tube 3. This grid is also connected over a resistance 4 of 4.72 kiloohms (K in Figs. 1 and 2) to the negative terminal 5 of a high voltage source of say 210 volts. The anode of tube 3 receives its high potential from and is connected over a resistance 7 of 100 kiloohms to the positive terminal 8 of the high voltage source and is also directly connected over a condenser 9 or 100 microfarads to the grid of a second oscillator tube 10. The anode of the latter tube is connected over a fixed resistance 11 of 10 kiloohms and a variable resistance 13 of 50 kiloohms to terminal 8. The same line connects the anode of tubes 3 and 10 to the center tap 14 of outer transformer 15. A condenser 12 connects the junction point of resistances 11, 13. The anode of tube 10 is also connected over a coupling condenser 34 of .005 microfarad to the negative terminal 5 of the high tension source.

Two terminals 16 and 17 of auto transformer 15 arranged symmetrically with respect to center terminal 14, at points intermediate terminal 17 and terminals 18 and 19, are connected to anodes of a pair of phase separation tubes or tube sections 20, 21 connected in parallel. These tubes may or may not be enclosed in the same envelope without exceeding the scope of this invention.

The grid of tube or tube section 20 is controlled over a condenser 22 of .01 microfarad from the anode of tube 10 while the grid of the second tube or tube section 21 is controlled over a fixed resistance 23 of 220 kiloohms and a variable resistance 35 of 82 kiloohms from the anode of oscillator tube 10. The resulting shape of the saw-tooth waves in grid and cathode circuits of tube 20 are indicated at 24, 25 respectively.

The cathodes of tubes or tube sections 20 or 21 are interconnected at 26 and connected over inductance 27 and condenser 13 of .01 microfarad to the grid of tube section 21. Inductance 27 is also connected over resistance 28 of 220 kiloohms to the grid of tube section 20 and also to the negative terminal 5 of the high voltage source of say 210 volts.

The cathodes of tubes or tube sections 3, 10 are connected over resistance 30 of 270 kiloohms to terminal 8.

Another connection extends from the cathodes of tubes 3, 10 to the sliding terminal 31 of a potentiometer 32 of 250 kiloohms one fixed terminal of which is free and the other fixed terminal of which is connected over a fixed resistance 33 of 82 kiloohms to the grid of oscillator tube 10.

The end terminals 18, 19 of auto transformer 15 are connected over coupling condensers 37, 38 of .005 microfarad to the horizontal deflection plates 39, 40 of television receiver tube 41 and also to a 6 kilovolt (kv.) high tension source.

Auto transformer 15 has an additional winding 42 which may be used to control an automatic frequency adjusting circuit well known in the art.

Figure 2:
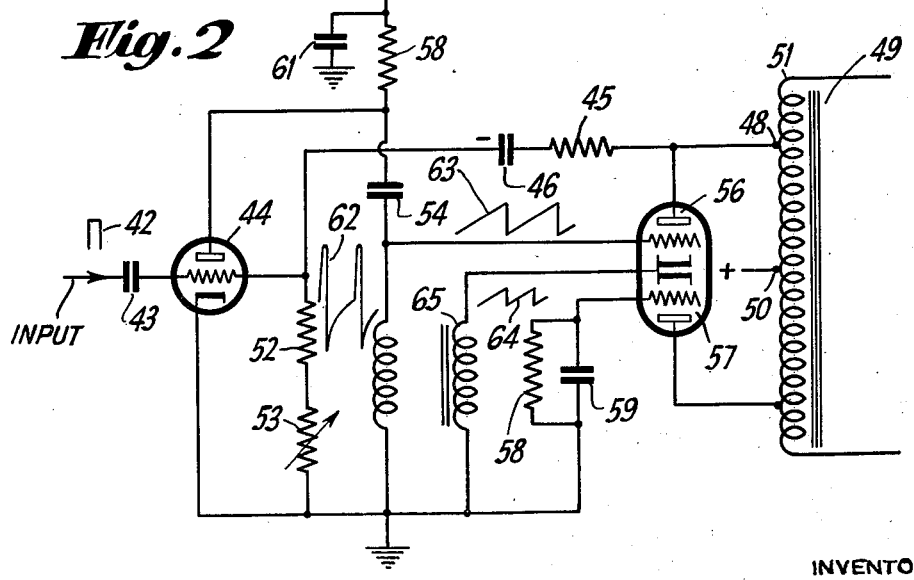
Fig. 2 is a modification of that circuit in which another feature of the invention is realized.

In the modification of Fig. 2, the number of oscillator tubes has been reduced to one, shown at 44, and oscillations are maintained by a back feed from one of the phase separation stages, shown at 55, 56.

Synchronizing pulses derived from the anode of section 56 are applied back over resistance 45 and coupling condenser 46 to the grid of oscillator tube 44. This grid is also connected over fixed resistance 52 and variable resistance 53 to ground. The anode of 56 is also connected to terminal 48 of auto transformer 49. This terminal is located in a manner similar to the arrangement shown in Fig. 1, between the positive center terminal 50 and the end terminal 51.

The cathode of oscillator stage 44 is connected to ground and the corresponding anode is coupled over condenser 54 to the grid of tube section 56, and over resistance 66 to ground.

The anode of oscillator tube 44 receives its potential over fixed resistance 58 and variable resistance 59 from the positive potential source 60.

The junction of resistances 58, 59 is capacitatively coupled over 61 to ground.

The grid of the corresponding other tube section 57 of the phase separation stage is connected over a condenser shunted resistance combination 67, 68 to ground.

The cathodes of stage 56, 57 are interconnected and connected over an inductance 65 to ground, in a manner similar to that indicated in Fig. 1, in accordance with the invention.

The wave shapes in the various anode, grid and cathode circuits of section 56 are indicated at 62, 63 and 64 respectively.

The circuit values and connections indicated in the drawing represent examples only of the invention, which may be varied and adjusted without exceeding the scope of the invention, in accordance with the principles set forth above.

What we claim is:

1. In combination, a cathode ray tube and deflecting means therefor, an auto transformer having step-down and step-up terminals; the step-up terminals being connected to said deflecting means; and a phase separation circuit connected to the step-down terminals.

2. System according to claim 1 comprising an impedance connected between the output and input sides of the phase separation circuit and adapted to effect phase inversion.

3. System according to claim 1 comprising an inductance connected between the output and input sides of the phase separation circuit and adapted to effect a phase inversion.

4. System according to claim 1 comprising a resistance connected between the output and input sides of the phase separation circuit and adapted to effect a phase inversion.

5. System according to claim 1 wherein said phase separation circuit comprises two amplifier stages having output electrodes connected in parallel to symmetrical step-down terminals of said auto transformer, and input electrodes at least one of which is connected to the cathode of the associated amplifier stage; an inductance being included in the latter connection.

6. System according to claim 1 wherein said phase separation circuit comprises two amplifier stages having output electrodes connected in parallel to step-down terminals of said auto transformer, and input electrodes at least one of which is connected to both cathodes of said amplifiers; a relatively low resistance inductance being included in series with said input electrode and cathodes; and the input electrode of said other amplifier being connected over relatively high resistance and said inductance to said cathodes.

7. System according to claim 1 wherein said phase separation circuit comprises two amplifier stages having output electrodes connected in parallel to symmetrical step-down terminals of said auto transformer, and input electrodes at least one of which is connected to both cathodes of said amplifiers; a relatively low resistance inductance being included in series with said input electrodes and cathodes; and the input electrodes of said other amplifier being connected over relatively high resistance and said inductance to said cathodes, there being also provided an oscillator circuit having at least one output electrode connected to at least one input electrode of said amplifiers.

8. System according to claim 1 comprising an oscillator circuit having its output connected to the input side of the phase separation circuit and its input coupled in feed back relationship with the output side of said phase separation circuit.

9. System according to claim 1 wherein said phase separation circuit comprises two stages connected in parallel to symmetrical step down terminals of the auto transformer, a central terminal of said auto transformer being connected to the positive terminal of a high voltage source and, an oscillator circuit comprising two stages connected in cascade; the phase separation stages having inter-connected cathodes connected to one of their input electrodes, and an output electrode connected to the other input electrode; a relative low resistance inductance being connected to between cathode and a predetermined negative potential; and a relatively high resistance being connected between said low resistance inductance and said other input electrode.

10. System according to claim 1 wherein said phase separation circuit includes two amplifiers having output electrodes connected to symmetrical step down terminals of said auto transformer, a central terminal of said auto transformer being connected to the positive terminal of a high voltage source; the separation circuit having over input terminal connected over a capacity shunted resistance to the negative terminal of a high voltage source; there being also provided a single stage oscillator having an input circuit controlled by the synchronizing signals and also controlled from one of the step up terminals; and an output circuit of said single stage coupled to the input electrode of one of the amplifiers; the cathodes of said amplifier being inter-connected; and an inductance connecting the cathodes of said amplifiers to the negative terminal of the high voltage source.

11. System according to claim 1 wherein said phase separation circuit includes two amplifiers having output electrodes connected to symmetrical step-down terminals of said auto transformer, a central terminal of said auto transformer being connected to the positive terminal of a high voltage source; the separation circuit having an input terminal connected over a capacity shunted resistance to the negative terminal of a high voltage source; there being also provided a single stage oscillator having an input circuit controlled by the synchronizing signals and also capacatively coupled to one of the step-up terminals, and an output electrode coupled to the input electrode of one of the amplifiers; and an inductance connecting the cathodes of said amplifiers to the negative terminal of the high voltage source; said one of the step down terminals being that which is not associated with said amplifiers including inductance.

12. System according to claim 1 wherein said phase separation circuit includes two amplifiers having output electrodes connected to symmetrical step-down terminals of said auto transformer, a central terminal of said auto transformer being connected to the positive terminal of a high voltage source; the separation circuit having an input terminal connected over a capacity shunted resistance to the negative terminal of a high voltage source; there being also provided a single stage oscillator having an input circuit coupled over series connected resistance-capacity to one of the step-up terminals, and an output electrode coupled to the input electrode of one of said amplifiers; and an inductance connecting the cathodes to the negative terminal of the high voltage source; said one of said step down terminals being that which is not associated with the amplifier including said inductance; and wherein the input circuit of the single stage oscillator also includes a grid capacity coupled to the synchronizing signals and resistance-coupled to the negative terminal of the high voltage source; the latter re-resistance coupling including fixed and adjustable resistances connected in series.

13. In a horizontal sweep circuit, at its output side, an auto transformer having step-up and step-down terminals and coupled to a two-stage phase separation circuit, the step-up terminals being coupled to a load circuit and step-down terminals being directly coupled to output electrodes of said separation circuit; and, at its input side, a two stage cascade connected oscillator circuit having an output electrode capacitively coupled to the input electrode of one stage of said separation circuit and having cathodes resistance-connected to ground; the cathodes of the phase separation circuit being inductance-connected to ground.

14. In a horizontal sweep circuit, at its output side, an auto-transformer having step-up and step-down terminals and coupled to a two-stage phase separation circuit, the step-up terminals being coupled to a load circuit and step-down terminals being directly coupled to output electrodes of said separation circuit; and, at its input side, a two stage cascade connected oscillator circuit having an output electrode capacitively coupled to the input electrode of one stage of said separation circuit and having cathodes resistance-connected to a predetermined negative potential and the input electrode of the other stage of said separation circuit being capacitively coupled to said predetermined potential; the input electrode of said first stage of said separation circuit being coupled to said predetermined potential over a resistance which is high compared with that of said inductance.

15. In a horizontal sweep circuit, at its output side, an auto transformer having step-up and step-down terminals and coupled to a two-stage phase separation circuit, the step-up terminals being capacitively coupled to a load circuit, and, at its input side, a single stage oscillator circuit having a control electrode capacitively coupled to the synchronizing signals, the step-down terminals being directly coupled to output electrodes of said separation circuit; there being the latter circuit having an output electrode capacitively feed back coupled to the control electrode of said oscillator circuit; said control electrode being also resistance-connected to the negative terminal of a high potential source.

16. A horizontal sweep circuit comprising, a multi-vibrator of the blocking type controlled by synchronizing signals, a phase separation circuit controlled by said multi-vibrator, and an auto transformer having step-down terminals controlled by the phase separation circuit and step-up terminals controlling a load circuit.

17. Circuit according to claim 16 wherein the phase separation circuit includes two stages having output electrodes connected to symmetrical step down terminals and one input electrode controlled from the multi-vibrator oscillator; the other being grounded over a capacity shunted resistance; and a low resistance inductance connecting the cathodes of said phase separation circuit to ground.

18. Circuit according to claim 16 wherein the phase separation circuit has two parallel connected stages and wherein the input electrode of one stage is controlled from the multi-vibrator oscillator and the input electrode of the other stage is coupled to ground and the cathodes of said two stages are coupled to ground; the former coupling including a capacity shunted resistance and the latter coupling including a low resistance inductance.

19. Circuit according to claim 16 wherein the phase separation circuit has two parallel connected stages and wherein the input electrode of one stage is controlled from the multi-vibrator oscillator and the input electrode of the other stage is coupled to ground and the cathodes of said two stages are coupled to ground; the former coupling including a capacity shunted resistance and the latter coupling including a low resistance inductance; wherein said first mentioned input electrode is also connected over a high resistance and said low resistance inductance to said cathodes.

20. Circuit according to claim 16 wherein the phase separation circuit has two parallel connected stages and wherein the input electrode of one stage is controlled from the multi-vibrator and the input electrode of the other stage is coupled to a predetermined negative potential; the cathodes of said stages being also coupled to said potential; the former coupling including an inductance and the latter coupling including a capacity.

W. J. OSTREICHER.
ROBERT S. MAUTNER.

REFERENCES CITED

The following references are of record in the file of this patent:

UNITED STATES PATENTS

| Number | Name | Date |
|---|---|---|
| 2,173,239 | Tolson | Sept. 19, 1939 |
| 2,260,546 | Tingley | Oct. 28, 1941 |
| 2,360,697 | Lyman | Oct. 17, 1944 |
| 2,443,030 | Foster | June 8, 1948 |